(12) United States Patent
Huang

(10) Patent No.: US 6,203,308 B1
(45) Date of Patent: *Mar. 20, 2001

(54) APPARATUS FOR MAKING RESILIENT HANDLE GRIPS

(76) Inventor: Ben Huang, 19472 Woodlands La., Huntington Beach, CA (US) 92648

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/940,796

(22) Filed: Sep. 30, 1997

Related U.S. Application Data

(63) Continuation-in-part of application No. 08/787,828, filed on Jan. 23, 1997, now Pat. No. 5,730,669, which is a continuation of application No. 08/567,339, filed on Dec. 28, 1995, now abandoned.

(51) Int. Cl.[7] ................................................. B29C 43/46
(52) U.S. Cl. ........................................ 425/363; 425/367
(58) Field of Search ................................. 425/335, 363, 425/367

(56) References Cited

U.S. PATENT DOCUMENTS

| | | | |
|---|---|---|---|
| 2,358,176 | * 9/1944 | MacDonald | 425/335 |
| 3,478,138 | * 11/1969 | Friesner | 425/335 |
| 4,732,638 | * 3/1988 | Baker et al. | 425/335 |
| 5,584,482 | 12/1996 | Huang | 273/75 |
| 5,797,813 | * 8/1998 | Huang | 473/549 |

* cited by examiner

Primary Examiner—James P. Mackey
(74) Attorney, Agent, or Firm—Fulwider Patton Lee & Utecht, LLP

(57) ABSTRACT

Method and apparatus for forming reinforced recessed side edges in a polyurethane-felt strip utilized to make a resilient handle grip by urging the strip between heated upper rollers and a lower roller to compress the side portions of the polyurethane layer so as to increase the density and strength of such side edges.

4 Claims, 5 Drawing Sheets

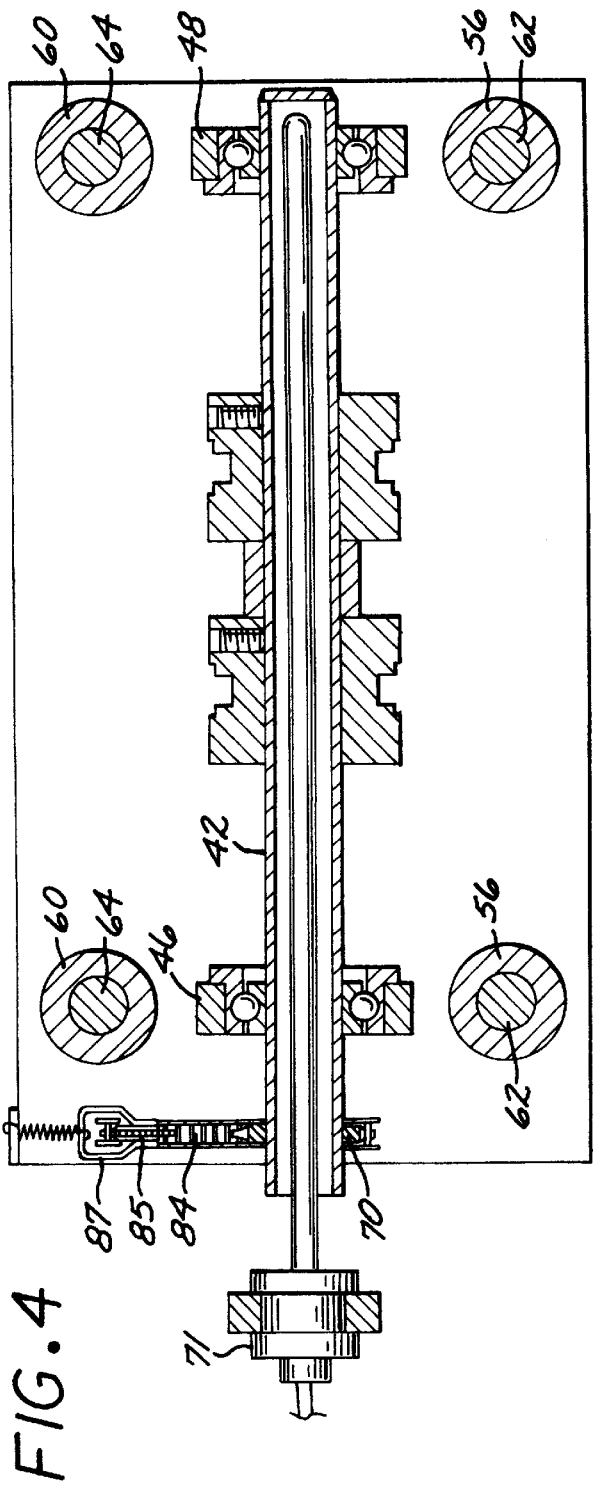
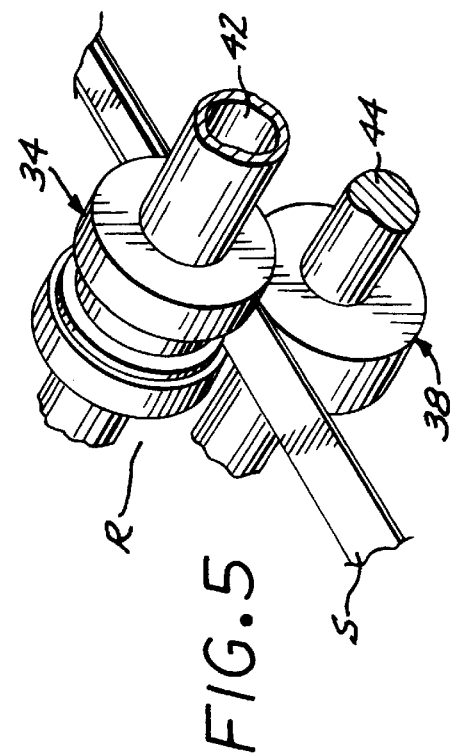
FIG. 4
FIG. 5

APPARATUS FOR MAKING RESILIENT HANDLE GRIPS

This application is a continuation in part of U.S. patent application Ser. No. 08/787,828, filed Jan. 23, 1997, now U.S. Pat. No. 5,730,669, which was a continuation of U.S. patent application Ser. No. 08/567,339, filed Dec. 28, 1995, now abandoned.

BACKGROUND OF THE INVENTION

The present invention relates to a method and apparatus for forming handle grips utilized on golf clubs, racquets, baseball bats and other devices employing handles that are subject to shock when such devices are impacted.

An earlier grip of this type shown in my U.S. Pat. No. 5,730,669, issued Mar. 24, 1998 on my application Ser. No. 08/787,828 utilizes a polyurethane layer bonded to a felt layer to define a unitary strip which is spirally wrapped about the handle of a golf club, racquet or the like to conform to the external configuration of such handle. The side edges of such grip utilize recessed, sidewardly and downwardly curved reinforced side edges along the length of the polyurethane-felt strip. Such reinforced side edges inhibit unraveling of the strip from the handle, enhance the frictional grip of the user and provides an improved appearance over existing grips. Where the grip is applied to golf clubs it reduces the interference with other golf clubs as a club is withdrawn from a golfer's bag. In such earlier grips the reinforced side edges were formed by urging an electrically heated platen against the side edges of the polyurethane layer of the strip so as to compress such side edges and thereby increase the density and hence the strength of the polyurethane layer in the vicinity of the side edges. A method of forming a polyurethane-felt grip of this type utilizing an electrically heated platen is disclosed in my above-identified U.S. Pat. No. 5,730,669. While the electrically heated platen system provides satisfactory results, the rate of production of polyurethane-felt strips utilizing applicant's heat-compressed reinforced side edges was limited, since movement of the strip relative to the platen was intermittent. Additionally, it was difficult to maintain the temperature of the entire surface of the platen contacting the strip along the length of the platen to the necessary magnitude to insure adequate compression of the polyurethane, particularly since the platen tends to cool off during its reciprocation relative the strip.

SUMMARY OF THE INVENTION

The applicant has developed an improved method and apparatus designed to solve the above set forth problems inherent to the use of a reciprocating electrically heated platen to form reinforced side edges in a polyurethane-felt strip utilized in making a resilient handle grip. Such method and apparatus employs opposed power-driver rollers which are rotated on parallel axes with the facing surfaces of the rollers defining the transverse cross-sectional contour of the reinforced side edges to urge the strip through the space separating the rollers. The upper roller assembly is maintained heated at a constant temperature necessary to permanently compress the side edges of the polyurethane-felt strip in forming the reinforced side edges thereby insuring a uniform density of the reinforced side edges. Since the rollers can operate continuously, the rate of production of the reinforced side edges can be significantly faster than by the use of a reciprocating heated platen, resulting in a significant reduction in the cost of manufacturing a polyurethane-felt strip having reinforced side edges.

BRIEF DESCRIPTION OF THE DRAWINGS

FIG. 4 is a horizontal sectional view taken in enlarged scale along line 4—4 of FIG. 1.

FIG. 5 is a broken perspective view in enlarged scale showing a detail of the upper and lower roller members of such apparatus.

DETAILED DESCRIPTION OF THE DRAWINGS

Figure 1:
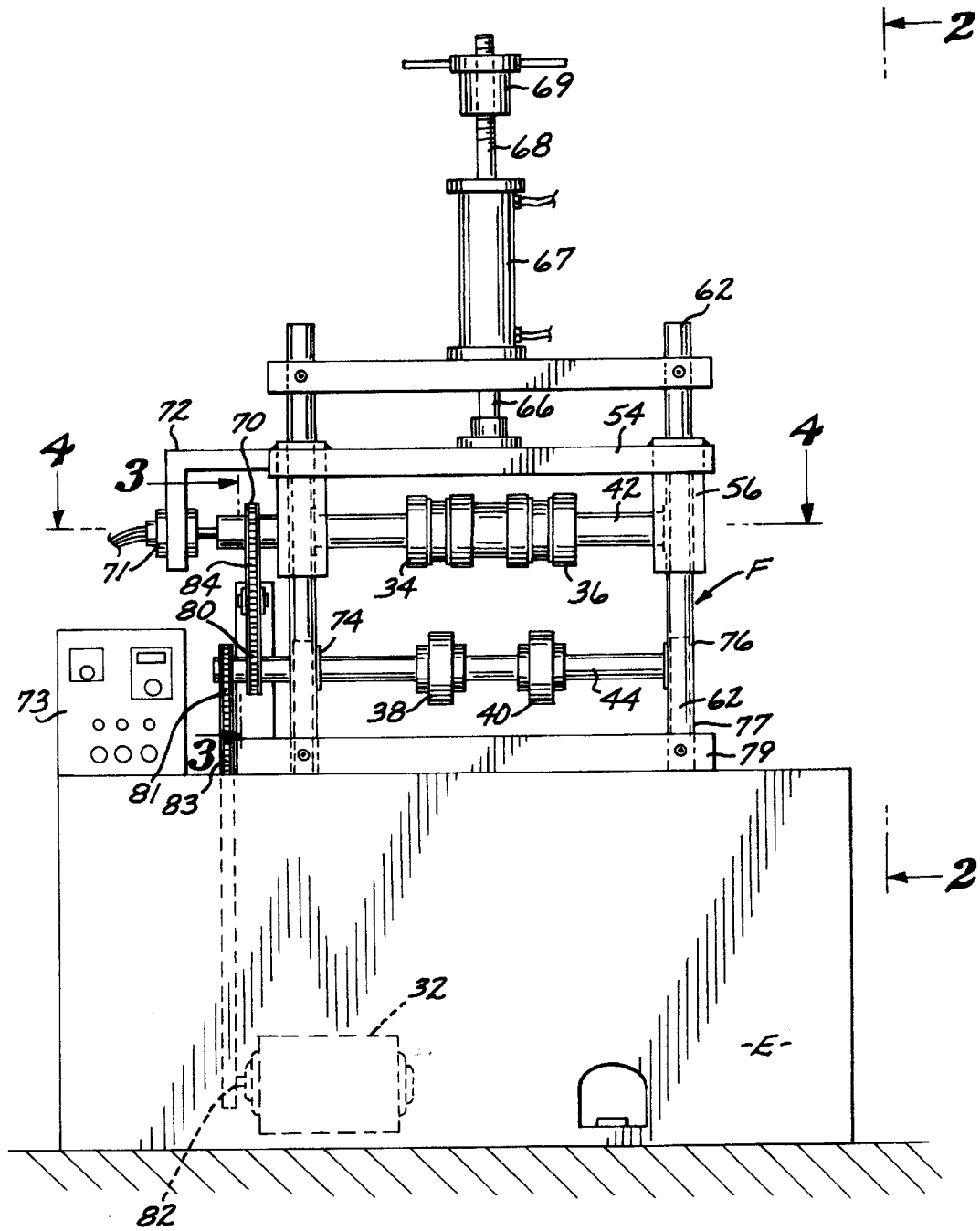
FIG. 1 is a front elevational view of a preferred form of apparatus employed in carrying out the method of the present invention.
Figure 2:
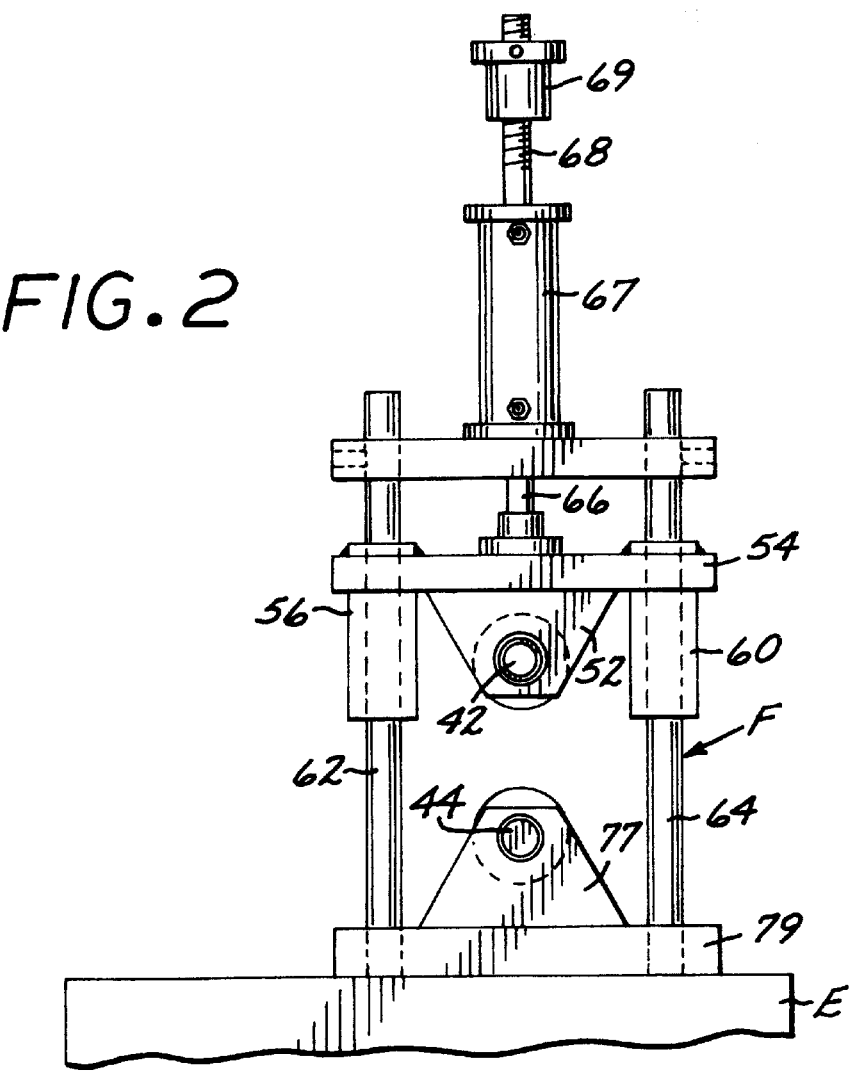
FIG. 2 is a broken side elevational view of such apparatus taken along line 2—2 in FIG. 1.

Referring to the drawings, a preferred method and apparatus embodying the present invention shown in FIGS. 1–7 is utilized to form heat compressed reinforced side edges 12 and 14 an elongated on a unitary, resilient polyurethane-felt strip S shown in detail in FIGS. 8–11. The resulting strip S is adapted to be spirally wrapped around a racquet handle or the like to provide a handle grip. By way of example, the completed strip S is adapted to be applied to the handle portion of a golf club shaft, a tennis or racquetball handle, or to the handle portion of a baseball bat. As shown in FIGS. 8–11, the resilient elongated strip S includes a open-pored textile layer, generally designated 20, the upper surface of which is bonded to the lower surface of a polyurethane layer, generally designated 24. Details of a method for forming such polyurethane felt elongated resilient strip S are described in my above-identified U.S. Pat. No. 5,730,669, as well as my U.S. Pat. No. 5,584,482 issued Dec. 17, 1996. The underside of the felt layer 24 is provided with a conventional adhesive 26, which is originally covered with a protective quick-release tape 28. To apply the strip S to a racquet handle, or the like (not shown) the protective tape 28 is stripped off the adhesive 26 whereby the strip S may be spirally wrapped around a racquet handle or the like. The strip S may be formed with vertically extending perforations 30 which enhance the absorption rate of perspiration from a user of the grip.

As indicated particularly in FIGS. 1–7, a preferred form of apparatus embodying the present invention is supported upon a base taking the form of an enclosure E containing a conventional electric motor 32. Enclosure E supports a frame F that carries a forming roller assembly R which forms reinforced side edges 12 and 14 on the polyurethane-felt strip S. Roller assembly R includes a pair of like upper rollers, generally designated 34 and 36, which cooperate with a lower roller, generally designated 38 and 40, to simultaneously form the reinforced side edges on the strips S. Upper rollers 34 and 36 are coaxially supported and keyed to an upper horizontal shaft 42, while lower roller 38 and 40 is carried by and keyed to a lower horizontal shaft 44 which is vertically spaced from the upper shaft. The upper and lower shafts rotate on parallel axes. Upper shaft 42 is rotatably supported by a pair of bearings 46 and 48 which depend from a pair of support gussets 52. The support gussets depend from a horizontal traveler plate 54. The front portion of traveler plate 54 is rigidly affixed to a pair of front slider blocks 56 while the rear portion of traveler plate 54 is rigidly secured to a pair of rear slider blocks 60. The four slider blocks are vertically slidably supported by front posts 62 and rear posts 64. The mid-portion of traveler plate 54 is attached to the lower end of a double-acting plunger 66 of a conventional fluid-actuated cylinder 67. The upper end of plunger 66 extends through the upper end of cylinder 67 and is formed with adjustment threads 68 which cooperate with a complementarily threaded stop nut 69 to adjust the vertical travel of plunger 66. The left-hand portion of upper shaft 42 extends outwardly from the left-hand support gusset 52 to receive a chain sprocket 70. The interior of the left-hand end of upper shaft 42 is provided with a conventional electric fitting 71 carried by bracket 72 secured to the left-hand edge of traveler plate 54 for heating the upper rollers 34 and 36. A control box 73 is connected to the fitting 71 in a conventional manner to constantly maintain a desired heating temperature within the upper rollers 34 and 36 by means of a conventional electric resistance heating system (not shown) disposed within such rollers. Lower shaft 44 is rotatably supported by a pair of bearings 74 and 75 which are rigidly supported by lower support gussets 77, the lower edges of which are rigidly affixed to a base plate 79 positioned on the top of enclosure E. The left-hand portion of the lower shaft 44 extends through lower bearing 74 and is provided with a sprocket 80 which is vertically aligned with upper sprocket 72. The left-hand end of the lower shaft 44 is keyed to a power-transfer pulley 81 which is aligned with and connected to a drive pulley 82 by a belt 83. Belt 83 is rotated by electric motor 32 to effect rotation of the lower shaft and accordingly the lower roller 38.

Figure 3:
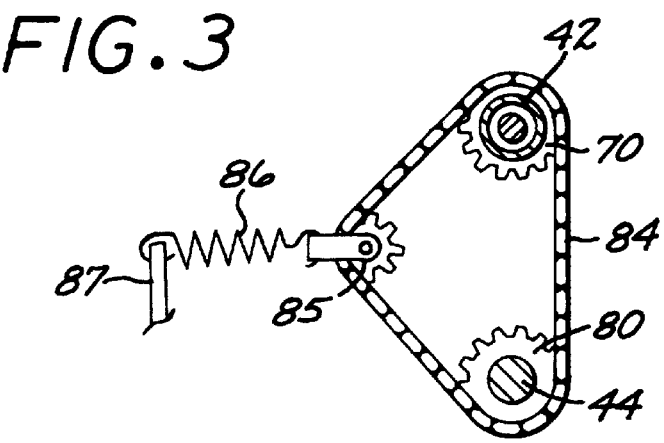
FIG. 3 is a vertical view taken in enlarged scale along line 3—3 of FIG. 1.
Figure 6:
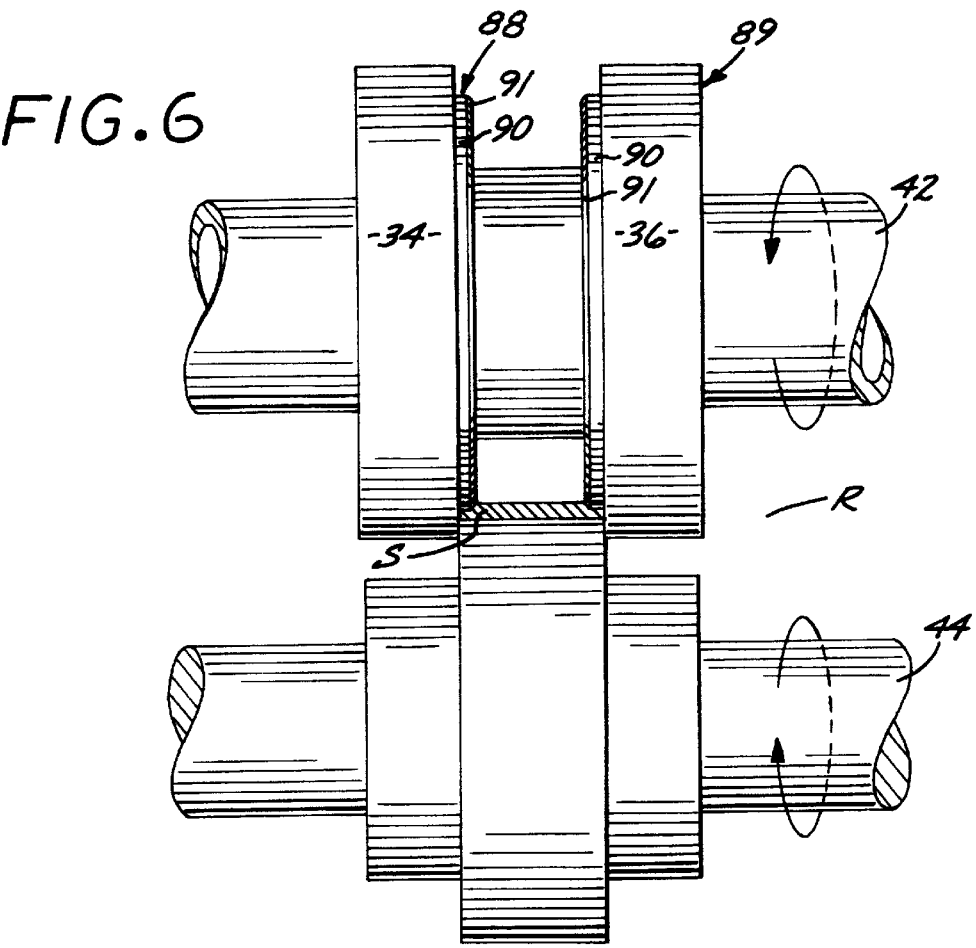
FIG. 6 is a broken front elevational view taken in enlarged scale of the roller members depicted in FIG. 5 while forming reinforced side edges in a polyurethane-felt strip.
Figure 7:
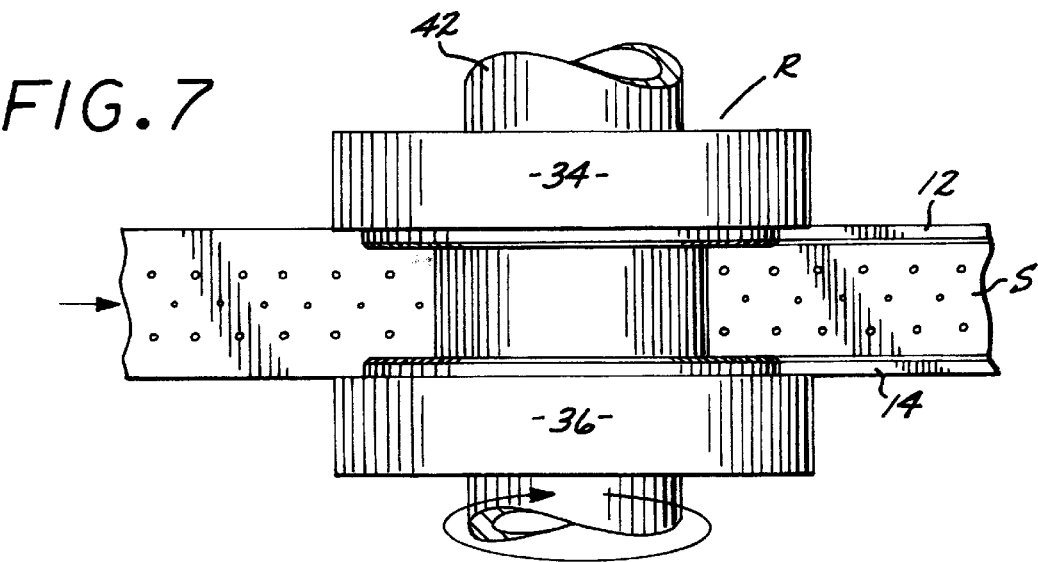
FIG. 7 is a broken top plan view of one of the roller members and the strip of FIG. 6.

Referring to FIGS. 1 and 3, a looped drive chain 84 drivingly interconnects the upper and lower shaft sprockets 70 and 80. The intermediate portion of such chain 84 is engaged with an adjustment sprocket 85 which is biased away from the shaft sprockets 70 and 80 by a tension spring 86 secured to a frame bracket 87. The spring 86 and sprocket 85 cooperate to maintain constant tension on the drive chain 84 when the vertical spacing between the upper and lower shafts is varied.

Referring now particularly to FIGS. 4–7 showing roller assembly R, the facing surfaces of upper rollers 34 and 36 are integrally formed with like coaxial presser discs 88 and 89 defining a mirror image. Each presser disc includes a horizontally extending peripheral surface 90 the proximate edge of which is formed with a radially and inwardly extending bevel portion 91. It should be understood that the shape of the presser discs defines a mirror image of the shape of the reinforced side edges 12 and 14 of a completed strip S. By way of example, the width of the reinforced side edges 12 and 14 shown in the drawings approximates 2 mm, while the depth of such side edges approximates 0.3 mm in a typical grip having a thickness of about 0.5 mm to 3.5 mm. Accordingly, the horizontally extending surfaces of presser discs 88 and 89 approximate 2 mm, and the depth of the bevel portions 91 approximate 0.3 mm. It should be understood that the width of one of the reinforced side edges may be greater than the width of the other reinforced side edge. Such arrangement is shown in my application Ser. No. 08/822,226 filed Mar. 21, 1997, now U.S. Pat. No. 5,797,813. The horizontal spacing between the inner or facing surfaces of the upper rollers is substantially equal to the width of strip S, i.e. about 20–25 mm. With continued reference to FIGS. 6 and 7, each of the lower rollers 38 and 40 have a width substantially equal to the width of strip S. Accordingly, the lower peripheral portion of the upper rollers and the upper peripheral portion of the lower rollers define a space having the cross-sectional profile of the completed strip S shown in FIG. 11.

Figure 8:
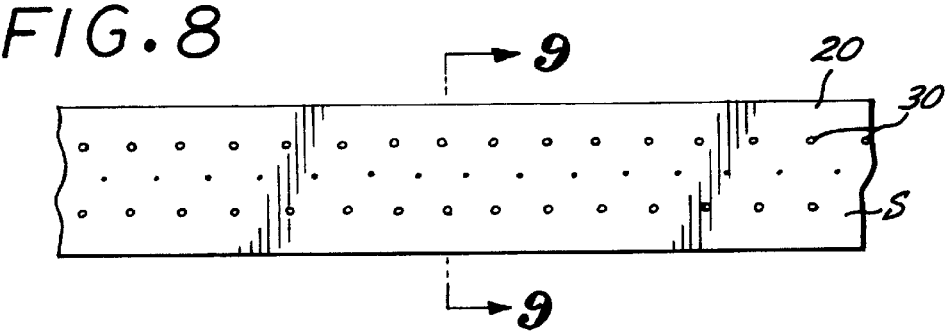
FIG. 8 is a broken top plan view of a polyurethane-felt strip before reinforced side edges have ben formed therein by the method and apparatus of the present invention.
Figure 9:
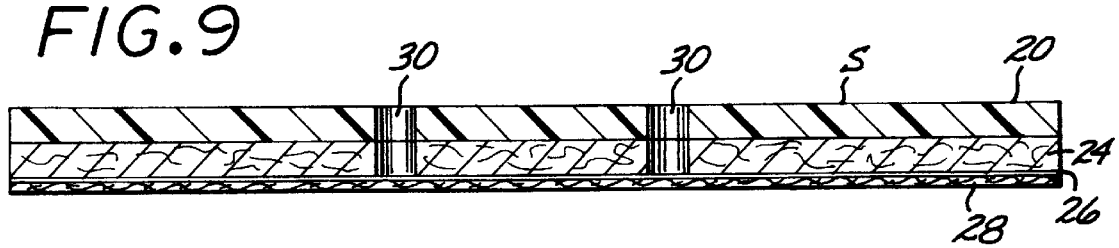
FIG. 9 is a vertical sectional view taken in enlarged along line 9—9 of FIG. 8.
Figure 10:
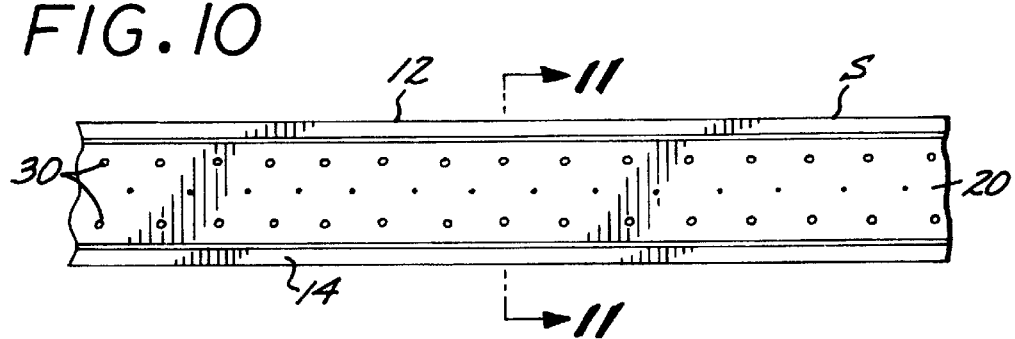
FIG. 10 is a top plan view of the polyurethane-felt strip of FIG. 8 after the reinforced side edges have been formed on such grip by the method and apparatus of the present invention.
Figure 11:
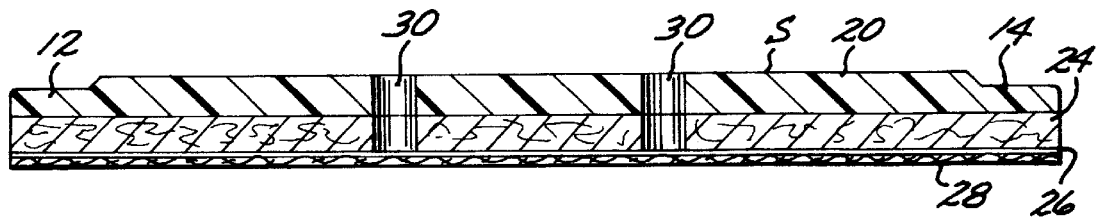
FIG. 11 is a vertical sectional view taken in enlarged scale taken along line 11—11 of FIG. 10.

In order to form the reinforced side edges 12 and 14 on the strip S of FIGS. 8 and 9, the strip is fed into the space between the upper and lower rollers as such rollers are rotated in different directions. Since the upper rollers are heated to a temperature necessary to permanently compress the outer side edges of the polyurethane edges (i.e. between 150° Centigrade and 250° Centigrade), as the strip is urged between such rollers the density and strength of such side edges is thereby increased to form the reinforced side edges 12 and 14 of the completed strip S of FIGS. 10 and 11.

If it is desired to form reinforced side edges on a strip (not shown) having a different thickness than that represented by the strip of FIGS. 8–11, the stopper nut 69 will be rotated so as to adjust the downward limit of vertical movement of plunger 66, and thereby compensate for the different thickness of different strips.

While there has been shown and described a preferred form of method and apparatus embodying the present invention, it will be apparent to those skilled in the art that various modification and changes can be made without departing from the spirit and the scope of the present invention. By way of example, any number of strips S can be simultaneously formed with reinforced side edges depending upon the number of upper and lower rollers utilized with such apparatus. Additionally, the upper and lower rollers could be disposed horizontally rather than vertically. It is not intended that the invention be limited except by the appended claims.

What is claimed is:

1. Apparatus for making a resilient handle grip having reinforced side edges formed of a strip that includes an upper polyurethane layer having its bottom surface bonded to the upper surface of a felt layer, with the strip being of a constant width and depth, said apparatus comprising:

a frame;

a bottom roller of substantially the same width as the width of the strip, said bottom roller being affixed to a horizontal lower shaft, said bottom roller having a horizontal surface, said lower shaft being rotatably supported by the frame;

a pair of coaxially aligned upper rollers carried by a horizontal upper shaft rotatably supported by the frame about an axis parallel to but spaced above the axis of rotation of the bottom roller;

facing surfaces formed on the upper rollers, said facing surfaces interfitting with radially outer ends of the bottom roller;

a coaxial presser disc coaxially formed on each of the facing surfaces of the upper rollers, said presser discs being vertically aligned with outer portions of the horizontal surface of the bottom roller;

peripheral surfaces of the presser discs being separated from the outer portions of the horizontal surface of the bottom roller by a predetermined distance less than said depth;

power-operated means on the frame for rotating the lower shaft and the upper shaft in opposite directions to continually urge the strip forwardly longitudinally through the rollers, with a lower surface of the strip supported by the bottom roller and side portions of an upper surface of the strip in contact with the peripheral surfaces of the presser discs;

heating means to heat the upper rollers to a predetermined temperature at which the presser discs permanently compress the side portions of the polyurethane layer to increase the density and strength of said side portions and to define the reinforced side edges on the grip as the strip is continually urged longitudinally through the rollers; and control means associated with the frame and the heating means to maintain the temperature of the upper rollers at said predetermined temperature.

2. Apparatus as set forth in claim 1, which further includes adjustment means interposed between the frame and the upper shaft to vary the distance between the bottom and upper rollers along a fixed vertical axis to accommodate strips of varying thicknesses.

3. Apparatus as set forth in claim 1 wherein the means to heat the upper rollers include electric resistance elements which are maintained at said predetermined temperature.

4. Apparatus as set forth in claim 2 wherein the means to heat the upper rollers include electric resistant elements which are maintained at said predetermined temperature.

* * * * *